United States Patent
Liao et al.

(10) Patent No.: US 9,577,561 B2
(45) Date of Patent: Feb. 21, 2017

(54) METHOD FOR SUPPRESSING A SPEED FLUCTUATION, A CONTROL APPARATUS AND A COMPRESSOR CONTROL SYSTEM

(71) Applicant: GUANGDONG MEIZHI COMPRESSOR CO., LTD., Foshan (CN)

(72) Inventors: Siqing Liao, Foshan (CN); Xinjie Ren, Foshan (CN); Wanjie Song, Foshan (CN); Weimin Xiang, Foshan (CN); Jijiang Yu, Foshan (CN); Cheng Zhang, Foshan (CN); Hong Guo, Foshan (CN); Jingtao Yang, Foshan (CN)

(73) Assignee: Guangdong Meizhi Compressor Co., Ltd., Foshan (CN)

( * ) Notice: Subject to any disclaimer, the term of this patent is extended or adjusted under 35 U.S.C. 154(b) by 49 days.

(21) Appl. No.: 14/758,469

(22) PCT Filed: Jul. 1, 2014

(86) PCT No.: PCT/CN2014/081415
§ 371 (c)(1),
(2) Date: Jun. 29, 2015

(87) PCT Pub. No.: WO2016/000215
PCT Pub. Date: Jan. 7, 2016

(65) Prior Publication Data
US 2016/0254772 A1 Sep. 1, 2016

(51) Int. Cl.
*H02P 23/04* (2006.01)
*H02P 21/05* (2006.01)
*H02P 25/02* (2016.01)

(52) U.S. Cl.
CPC ............... *H02P 23/04* (2013.01); *H02P 21/05* (2013.01); *H02P 25/022* (2013.01)

(58) Field of Classification Search
CPC ..... B62D 5/046; B62D 5/0463; B62D 5/0472; H02P 21/04; H02P 21/05; H02P 21/06; H02P 21/22; H02P 21/0003; H02P 29/0038; H02P 6/16; H02P 21/0089; H02P 25/03; H02P 6/18; G05B 11/30; G05B 11/42
(Continued)

(56) References Cited

U.S. PATENT DOCUMENTS 5,656,911 A * 8/1997 Nakayama .......... H02P 21/0089
318/718
6,810,986 B2 * 11/2004 Takagi ................. B62D 5/0463
180/446
(Continued)

FOREIGN PATENT DOCUMENTS

CN    102771043 A    11/2012
CN    103178767 A    6/2013
(Continued)

OTHER PUBLICATIONS

International Search Report corresponding to International Application No. PCT/CN2014/081415, mailed Mar. 18, 2015. 2 pages.

*Primary Examiner* — Paul Ip
(74) *Attorney, Agent, or Firm* — Lathrop & Gage LLP (57) ABSTRACT

A method for suppressing a speed fluctuation of a permanent magnet synchronous motor is provided in the present disclosure, including: obtaining a target speed $\omega\_{ref}$, a feedback speed, a fluctuation speed $\Delta\omega$, a q-axis inductance $L_q$ and a permanent magnet flux linkage $\phi_f$ of the permanent magnet synchronous motor; performing a PI adjusting on $\Delta\omega$ to obtain a q-axis reference current $I_{q\_ref}$, and obtaining a q-axis target voltage $U^*_q$ according to $I_{q\_ref}$, $\omega\_{ref}$, $\Delta\omega$ and $\phi_f$; performing a PI control on a q-axis actual voltage according to $U^*_q$ to obtain a q-axis compensation current $I_{q\_add}$; obtaining a d-axis target voltage $U^*_d$ according to $I_{q\_ref}$
(Continued)

$I_{q\_add}$, $\omega\_{ref}$, $\Delta\omega$ and $L_q$; performing a PI control on a d-axis actual voltage according to $U^*_d$ to obtain a d-axis compensation current $I_{d\_add}$; superposing $I_{q\_add}$ and $I_{q\_ref}$ to perform a feedforward compensation on a q-axis current and superposing $I_{d\_add}$ and the d-axis reference current to perform a feedforward compensation on a d-axis current.

12 Claims, 7 Drawing Sheets

(58) Field of Classification Search
USPC ..... 318/702, 609, 610, 400.33, 432, 400.23; 180/446
See application file for complete search history.

(56) References Cited

U.S. PATENT DOCUMENTS

| | | | | |
|---|---|---|---|---|
| 6,927,548 B2* | 8/2005 | Nishizaki | ........... | H02P 21/06 318/432 |
| 7,034,493 B2* | 4/2006 | Yoshimoto | ........... | H02P 21/06 318/629 |
| 7,188,702 B2* | 3/2007 | Takagi | ........... | B62D 5/046 180/446 |
| 7,474,067 B2* | 1/2009 | Ueda | ........... | H02P 21/05 318/400.23 |
| 8,125,175 B2* | 2/2012 | Yoneda | ........... | B62D 5/046 318/400.01 |
| 8,150,580 B2* | 4/2012 | Suzuki | ........... | B62D 5/046 701/41 |
| 2003/0178245 A1* | 9/2003 | Takagi | ........... | B62D 5/0463 180/446 |
| 2004/0195993 A1* | 10/2004 | Yoshimoto | ........... | H02P 21/06 318/802 |
| 2005/0045414 A1* | 3/2005 | Takagi | ........... | B62D 5/046 180/446 |
| 2007/0052381 A1* | 3/2007 | Ueda | ........... | H02P 21/05 318/432 |
| 2008/0167779 A1* | 7/2008 | Suzuki | ........... | B62D 5/046 701/42 |
| 2009/0128081 A1* | 5/2009 | Yoneda | ........... | B62D 5/046 318/689 |
| 2012/0194113 A1* | 8/2012 | Lee | ........... | H02P 6/18 318/400.33 |
| 2013/0241461 A1* | 9/2013 | Huang | ........... | G05B 11/30 318/609 |

FOREIGN PATENT DOCUMENTS

| | | |
|---|---|---|
| CN | 103532462 A | 1/2014 |
| JP | 2006136053 A | 5/2006 |
| KR | 101029319 B1 | 4/2011 |
| KR | 101220915 B1 | 2/2013 |

* cited by examiner

Fig. 10

METHOD FOR SUPPRESSING A SPEED FLUCTUATION, A CONTROL APPARATUS AND A COMPRESSOR CONTROL SYSTEM

CROSS REFERENCE TO RELATED APPLICATION

This application claims priority under 35 U.S.C 371 to and is a U.S. National Phase application of International Application No. PCT/CN2014/081415, filed with the State Intellectual Property Office of P. R. China on Jul. 1, 2014, the entire contents of which are incorporated herein by reference.

FIELD

The present disclosure relates to a field of permanent magnet synchronous motor (PMSM) control technology, and more particularly, to a method for suppressing a speed fluctuation of a permanent magnet synchronous motor, a control apparatus of a permanent magnet synchronous motor and a compressor control system including the control apparatus of a permanent magnet synchronous motor.

BACKGROUND

During controlling a permanent magnet synchronous motor, it needs to suppress a speed fluctuation occurring during operation of the permanent magnet synchronous motor. The suppression of the speed fluctuation may relatively suppress a noise and a vibration, improve a comfort of a user, and prevent an occurrence of an out-of-step of the motor under abrupt change of load.

In the related art, there are at least following problems in the control of the permanent magnet synchronous motor:

1. Since a bandwidth of a speed loop is lower, the out-of-step may occur easily under abrupt change of load, and the speed fluctuation is big, which takes a long time to stabilize the speed. Thus, the existing control method is not applicable in some special occasions such as a servo motor control. At present, a conventional practice is to increase the bandwidth of the speed loop. However, it may cause problems that a speed ripple is big, a speed overshoot is easy to occur, and there is no bandwidth which is suitable for whole frequency bands and various load conditions.

2. A periodic load may lead to the speed fluctuation of the motor, such as a speed fluctuation caused by a compressor, and if this speed fluctuation is not suppressed, a vibration may be generated, and if an air conditioner is running for a long time in a case of large vibration, a pipe crack may be easy to occur and a quality of the air conditioner may be affected seriously.

Therefore, there is a need to improve the control technology of the permanent magnet synchronous motor.

SUMMARY

Embodiments of the present disclosure seek to solve problems existing in the related art to at least some extent.

Accordingly, a first objective of the present disclosure is to provide a method for suppressing a speed fluctuation of a permanent magnet synchronous motor, which may realize an effective suppression of the speed fluctuation during operation of the permanent magnet synchronous motor by performing feedforward compensation on a d-axis current and a q-axis current.

A second objective of the present disclosure is to provide a control apparatus of a permanent magnet synchronous motor. A third objective of the present disclosure is to provide a compressor control system.

In order to achieve above objectives, embodiments of a first aspect of the present disclosure provide a method for suppressing a speed fluctuation of a permanent magnet synchronous motor, including: obtaining a target speed and a feedback speed of the permanent magnet synchronous motor, and obtaining a fluctuation speed of the permanent magnet synchronous motor according to the target speed and the feedback speed; obtaining a q-axis inductance and a permanent magnet flux linkage of the permanent magnet synchronous motor; performing a speed loop proportional-integral (PI) adjusting on the fluctuation speed to obtain a q-axis reference current, and obtaining a q-axis target voltage according to the q-axis reference current, the target speed, the fluctuation speed and the permanent magnet flux linkage; performing a PI control on a q-axis actual voltage according to the q-axis target voltage to obtain a q-axis compensation current; obtaining a d-axis target voltage according to the q-axis reference current, the q-axis compensation current, the target speed, the fluctuation speed and the q-axis inductance, and performing a PI control on a d-axis actual voltage according to the d-axis target voltage to obtain a d-axis compensation current; superposing the q-axis compensation current on the q-axis reference current to perform a feedforward compensation on a q-axis current and superposing the d-axis compensation current on the d-axis reference current to perform a feedforward compensation on a d-axis current.

With the method for suppressing a speed fluctuation of a permanent magnet synchronous motor according to embodiments of the present disclosure, the target speed, the feedback speed, the q-axis inductance and the permanent magnet flux linkage of the permanent magnet synchronous motor are obtained firstly, and the fluctuation speed of the permanent magnet synchronous motor is obtained according to the target speed and the feedback speed, and then the speed loop PI adjusting is performed on the fluctuation speed to obtain the q-axis reference current, and the q-axis target voltage is obtained according to the q-axis reference current, the target speed, the fluctuation speed and the permanent magnet flux linkage, and then the PI control is performed on the q-axis actual voltage according to the q-axis target voltage to obtain the q-axis compensation current, meanwhile the d-axis target voltage is obtained according to the q-axis reference current, the q-axis compensation current, the target speed, the fluctuation speed and the q-axis inductance, and the PI control is performed on the d-axis actual voltage according to the d-axis target voltage to obtain the d-axis compensation current, finally the q-axis compensation current and the q-axis reference current are superposed to perform the feedforward compensation on the q-axis current, and the d-axis compensation current and the d-axis reference current are superposed to perform the feedforward compensation on the d-axis current. Therefore, according to the method for suppressing a speed fluctuation of a permanent magnet synchronous motor of embodiments of the present disclosure, by performing the feedforward compensation on the d-axis current and the q-axis current, an adjusting on the q-axis voltage and the d-axis voltage is realized, thus realizing an effective suppression of the speed fluctuation during operation of the permanent magnet synchronous motor, reducing the occurrence of the vibration, preventing the occurrence of the out-of-step caused if an electromagnetic torque cannot track a load torque in a case of periodic load or abrupt change of load, and ensuring a stable operation of the permanent magnet synchronous motor.

In some embodiments, the q-axis target voltage is obtained according to a formula of $$U^*_q = I_{q\_ref} \times R + (\omega\_ref - \text{lowpass}(\Delta\omega)) \times \phi_f$$

where $U^*_q$ represents the q-axis target voltage, $I_{q\_ref}$ represents the q-axis reference current, R represents a phase resistance, $\omega\_ref$ represents the target speed, $\Delta\omega$ represents the fluctuation speed and $\phi_f$ represents the permanent magnet flux linkage.

In some embodiments, the d-axis target voltage is obtained according to a formula of $$U^*_d = (I_{q\_ref} + I_{q\_add}) \times (\omega\_ref - \text{lowpass}(\Delta\omega)) \times (-L_q)$$

where $U^*_d$ represents the d-axis target voltage, $I_{q\_ref}$ represents the q-axis reference current, $I_{q\_add}$ represents the q-axis compensation current, $\omega\_ref$ represents the target speed, $\Delta\omega$ represents the fluctuation speed and $L_q$ represents the q-axis inductance.

In some embodiments, the permanent magnet synchronous motor is controlled by taking the d-axis target current as zero, if the q-axis target voltage is obtained or the d-axis target voltage is obtained.

In order to achieve above objectives, embodiments of a second aspect of the present disclosure provide a control apparatus of a permanent magnet synchronous motor, including: an obtaining module, configured to obtain a target speed and a feedback speed of the permanent magnet synchronous motor, to obtain a fluctuation speed of the permanent magnet synchronous motor according to the target speed and the feedback speed, and to obtain a q-axis inductance and a permanent magnet flux linkage of the permanent magnet synchronous motor; a q-axis compensation current calculating module, configured to perform a speed loop PI adjusting on the fluctuation speed to obtain a q-axis reference current, to obtain a q-axis target voltage according to the q-axis reference current, the target speed, the fluctuation speed and the permanent magnet flux, and to perform a PI control on a q-axis actual voltage according to the q-axis target voltage to obtain a q-axis compensation current; a d-axis compensation current calculating module, configured to obtain a d-axis target voltage according to the q-axis reference current, the q-axis compensation current, the target speed, the fluctuation speed and the q-axis inductance, and to perform a PI control on a d-axis actual voltage according to the d-axis target voltage to obtain a d-axis compensation current; a q-axis current compensation module, configured to superpose the q-axis compensation current and the q-axis reference current to perform a feedforward compensation on a q-axis current; a d-axis current compensation module, configured to superpose the d-axis compensation current and the d-axis reference current to perform a feedforward compensation on a d-axis current.

With the control apparatus of a permanent magnet synchronous motor according to embodiments of the present disclosure, the target speed, the feedback speed, the q-axis inductance and the permanent magnet flux linkage of the permanent magnet synchronous motor are obtained by the obtaining module, and the fluctuation speed of the permanent magnet synchronous motor is obtained by the obtaining module according to the target speed and the feedback speed, and then the q-axis compensation current is obtained by the q-axis compensation current calculating module and the d-axis compensation current is obtained by the d-axis compensation current calculating module, finally the q-axis compensation current and the q-axis reference current are superposed by the q-axis current compensation module to perform the feedforward compensation on the q-axis current, and the d-axis compensation current and the d-axis reference current are superposed by the d-axis current compensation module to perform the feedforward compensation on the d-axis current. Therefore, according to the control apparatus of a permanent magnet synchronous motor of embodiments of the present disclosure, by performing the feedforward compensation on the d-axis current and the q-axis current, the adjusting on the d-axis voltage and the q-axis voltage is realized, thus realizing an effective suppression of the speed fluctuation during operation of the permanent magnet synchronous motor, reducing the occurrence of the vibration, preventing the occurrence of the out-of-step caused if an electromagnetic torque cannot track a load torque in a case of periodic load or abrupt change of load, and ensuring a stable operation of the permanent magnet synchronous motor.

In some embodiments, the q-axis target voltage is obtained by the q-axis compensation current calculating module according to a formula of $$U^*_q = I_{q\_ref} \times R + (\omega\_ref - \text{lowpass}(\Delta\omega)) \times \phi_f$$

where $U^*_q$ represents the q-axis target voltage, $I_{q\_ref}$ represents the q-axis reference current, R represents a phase resistance, $\omega\_ref$ represents the target speed, $\Delta\omega$ represents the fluctuation speed and $\phi_f$ represents the permanent magnet flux linkage.

In some embodiments, the d-axis target voltage is obtained by the d-axis compensation current calculating module according to a formula of $$U^*_d = (I_{q\_ref} + I_{q\_add}) \times (\omega\_ref - \text{lowpass}(\Delta\omega)) \times (-L_q)$$

where $U^*_d$ represents the d-axis target voltage, $I_{q\_ref}$ represents the q-axis reference current, $I_{q\_add}$ represents the q-axis compensation current, $\omega\_ref$ represents the target speed, $\Delta\omega$ represents the fluctuation speed and $L_q$ represents the q-axis inductance.

In some embodiments, the control apparatus controls the permanent magnet synchronous motor by taking the d-axis target current as zero, if the q-axis target voltage is obtained by the q-axis compensation current calculating module or the d-axis target voltage is obtained by the d-axis compensation current calculating module.

Furthermore, embodiments of a third aspect of the present disclosure provide a compressor control system including the control apparatus of the permanent magnet synchronous motor according to the second aspect of the present disclosure.

With the compressor control system according to embodiments of the present disclosure, by performing the feedforward compensation on the d-axis current and the q-axis current of the permanent magnet synchronous motor with the control apparatus of the permanent magnet synchronous motor, an adjusting on the q-axis voltage and the d-axis voltage is realized, thus realizing an effective suppression of the speed fluctuation during operation of the permanent magnet synchronous motor, reducing the occurrence of the vibration, preventing the occurrence of the out-of-step caused if an electromagnetic torque cannot track a load torque in a case of periodic load or abrupt change of load, and ensuring a stable operation of the permanent magnet synchronous motor. Therefore, according to the compressor control system of embodiments of the present disclosure, the speed fluctuation of the permanent magnet synchronous motor may be suppressed, thus reducing the occurrence of the vibration, preventing a pipe crack risk caused in a case that an air conditioner is running for a long time with the large vibration, ensuring a quality of the air conditioner and improving a comfort of a user.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Figure 1:
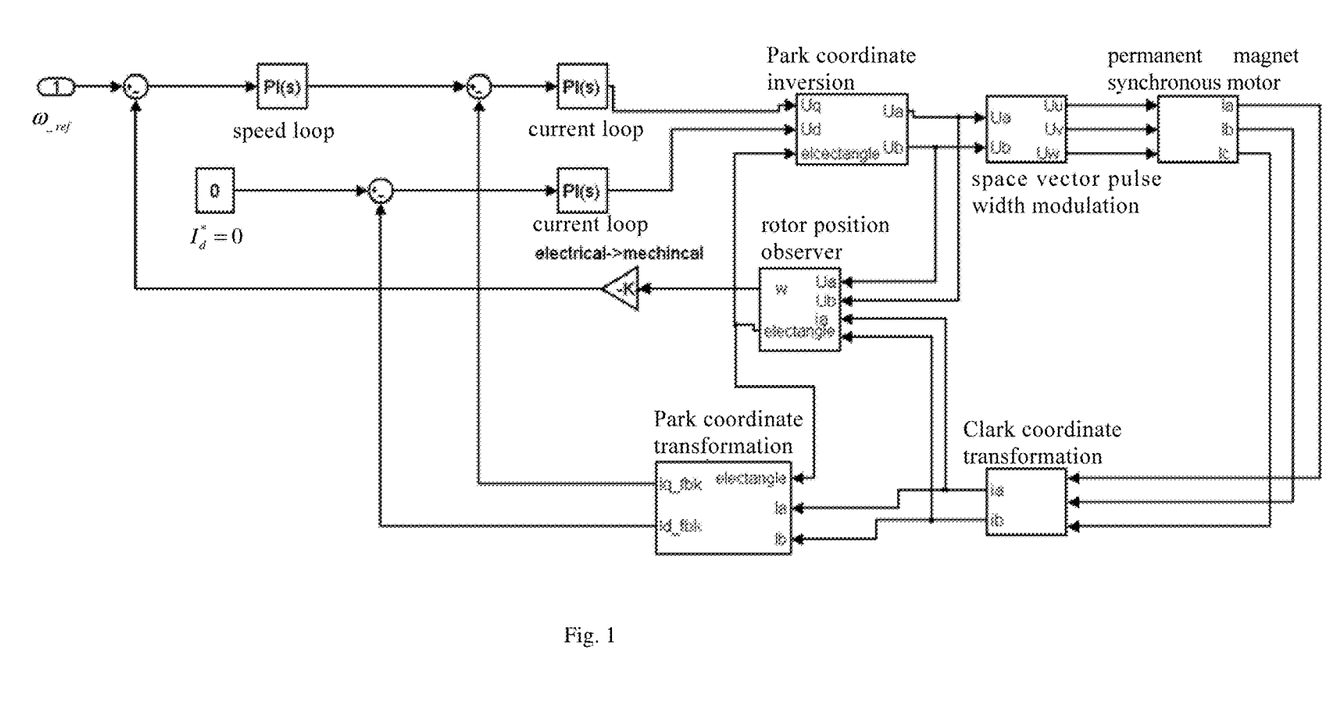
FIG. 1 is a schematic diagram illustrating a control principle of a conventional vector control system of a permanent magnet synchronous motor when a d-axis target current $I^*_d=0$.
Figure 2:
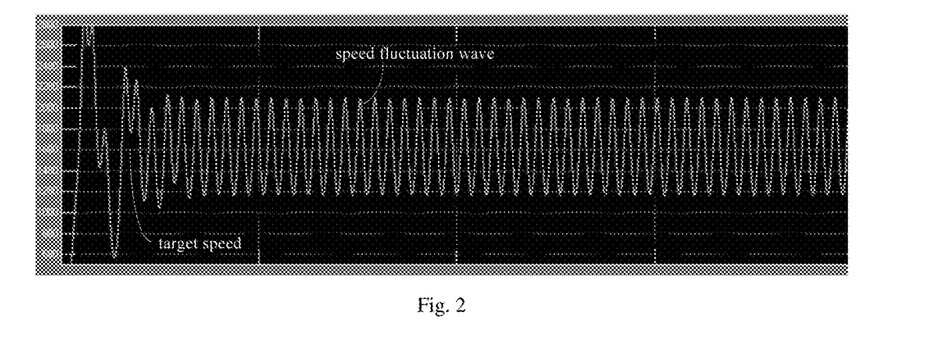
FIG. 2 is a schematic diagram illustrating a speed fluctuation caused by a load of an inverter compressor.

Firstly, a vector control system of a permanent magnet synchronous motor in the related art may be briefly described. A schematic diagram illustrating a control principle of the conventional vector control system of the permanent magnet synchronous motor when a d-axis target current $I^*_d=0$ is shown in FIG. 1, in which a rotor position observer is generally expanded by adopting a back EMF (electromotive force) expanding method. Since the conventional vector control system uses a double closed loop control, it requires that a bandwidth of an inner loop is far greater than that of an outer loop. The outer loop which is a speed loop may be adjusted relatively slowly. If a periodic sine wave load (1.5 NM) is added per mechanical cycle, the speed fluctuation may be about ±500 rpm/min as shown in FIG. 2, and this speed fluctuation is obviously not acceptable for the permanent magnet synchronous motor having the target speed of 1600 RPM/min Therefore, there is a need to suppress the speed fluctuation when the permanent magnet synchronous motor is running.

If a d-axis current of the permanent magnet synchronous motor is 0, an electromagnetic torque control equation is denoted according to a formula of $$T_e = \frac{3}{2} P_n \varphi_f I_q \qquad (1)$$

where $T_e$ represents an electromagnetic torque of the permanent magnet synchronous motor, $P_n$ represents a number of pole-pairs of the permanent magnet synchronous motor, $\varphi_f$ represents a permanent magnet flux linkage and $I_q$ represents a q-axis current.

A voltage equation of the permanent magnet synchronous motor is denoted according to a formula of $$\begin{pmatrix} Ud \\ Uq \end{pmatrix} = \begin{pmatrix} R+pL_d & -\omega L_q \\ \omega L_d & R+pL_q \end{pmatrix} \begin{pmatrix} Id \\ Iq \end{pmatrix} + \omega \varphi_f \begin{pmatrix} 0 \\ 1 \end{pmatrix} \qquad (2)$$

where R represents a phase resistance, p represents a differential operator, ω represents an electric angular velocity, $L_q$ represents a quadrature axis (i.e. q-axis) inductance, $L_d$ represents a direct axis (i.e. d-axis) inductance, Ud represents a direct axis (i.e. d-axis) voltage, Uq represents a quadrature axis (i.e. q-axis) voltage.

A motor output power of the permanent magnet synchronous motor is denoted according to a formula of $$P = TP_n \omega \quad (3)$$

where P represents the motor output power, T represents the electromagnetic torque of the permanent magnet synchronous motor, i.e., $T_e$.

According to formula (2) and formula (3), if the d-axis current is zero, a formula may be derived as follows, $$\begin{cases} \varphi_f \omega + I_q R = U_q \\ -\omega L_q I_q = U_d \end{cases} \quad (4)$$

Therefore, it may be obtained from the formula (4) that, if a speed of the permanent magnet synchronous motor is definite, $U_q$ is substantially definite and $U_d$ increases as the load increases. Precisely based on that, the present disclosure realizes an effective suppression of the speed fluctuation during operation of the permanent magnet synchronous motor by performing feedforward compensation on the d axis current and the q axis current, thus preventing an occurrence of the out-of-step caused if the electromagnetic torque cannot track a load torque in a case of periodic load (compressor) or abrupt change of load.

A method for suppressing a speed fluctuation of a permanent magnet synchronous motor, a control apparatus of a permanent magnet synchronous motor and a compressor control system including the control apparatus of a permanent magnet synchronous motor will be described in the following with reference to drawings.

Figure 3:
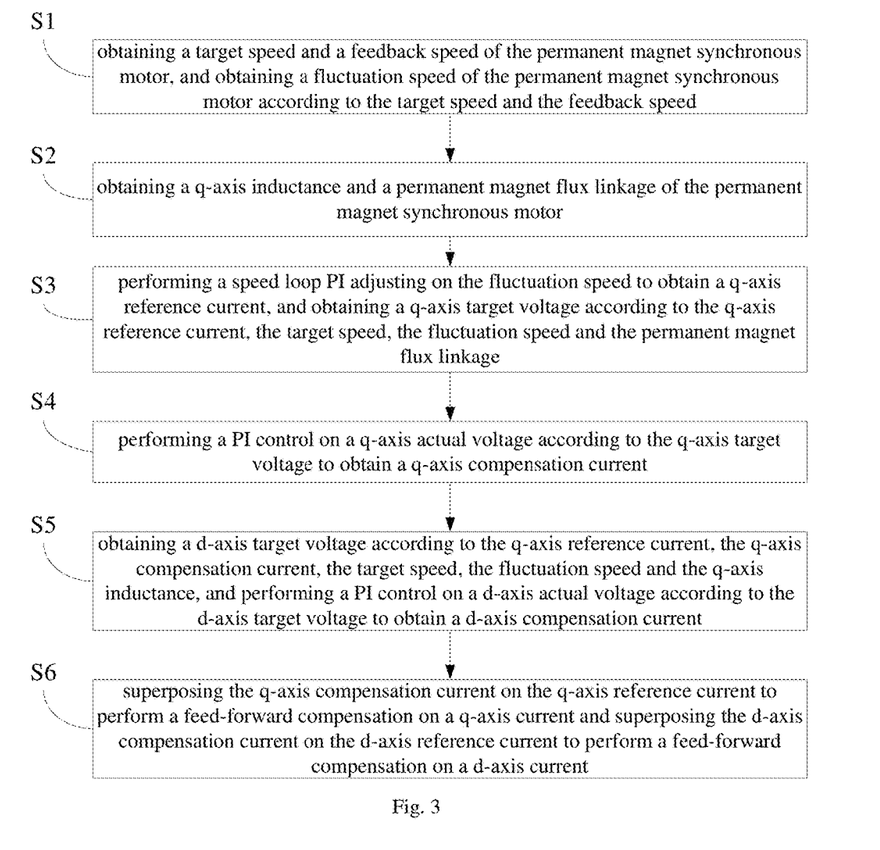
FIG. 3 is a flow chart illustrating a method for suppressing a speed fluctuation of a permanent magnet synchronous motor according to an embodiment of the present disclosure.

FIG. 3 is a flow chart illustrating a method for suppressing a speed fluctuation of a permanent magnet synchronous motor according to an embodiment of the present disclosure. As shown in FIG. 3, the method for suppressing a speed fluctuation of a permanent magnet synchronous motor includes following steps.

In step S1, a target speed and a feedback speed of the permanent magnet synchronous motor are obtained, and a fluctuation speed of the permanent magnet synchronous motor is obtained according to the target speed and the feedback speed.

The fluctuation speed Δω (i.e. speed error represented as speederror) is equal to the target speed $\omega_{\_ref}$ minus the feedback speed. The feedback speed of the permanent magnet synchronous motor may be detected by the rotor position observer.

In step S2, a q-axis inductance and a permanent magnet flux linkage of the permanent magnet synchronous motor are obtained.

In step S3, a speed loop PI adjusting is performed on the fluctuation speed to obtain a q-axis reference current, and a q-axis target voltage is obtained according to the q-axis reference current, the target speed, the fluctuation speed and the permanent magnet flux linkage.

In some embodiments, the q-axis target voltage is obtained according to a formula of $$U^*_q = I_{q\_ref} \times R + (\omega_{\_ref} - \text{lowpass}(\Delta\omega)) \times \phi_f \quad (5)$$

where $U^*_q$ represents the q-axis target voltage, $I_{q\_ref}$ represents the q-axis reference current, R represents a phase resistance, $\omega_{\_ref}$ represents the target speed, Δω represents the fluctuation speed and $\phi_f$ represents the permanent magnet flux linkage.

In step S4, a PI control is performed on a q-axis actual voltage according to the q-axis target voltage to obtain a q-axis compensation current.

Figure 4:
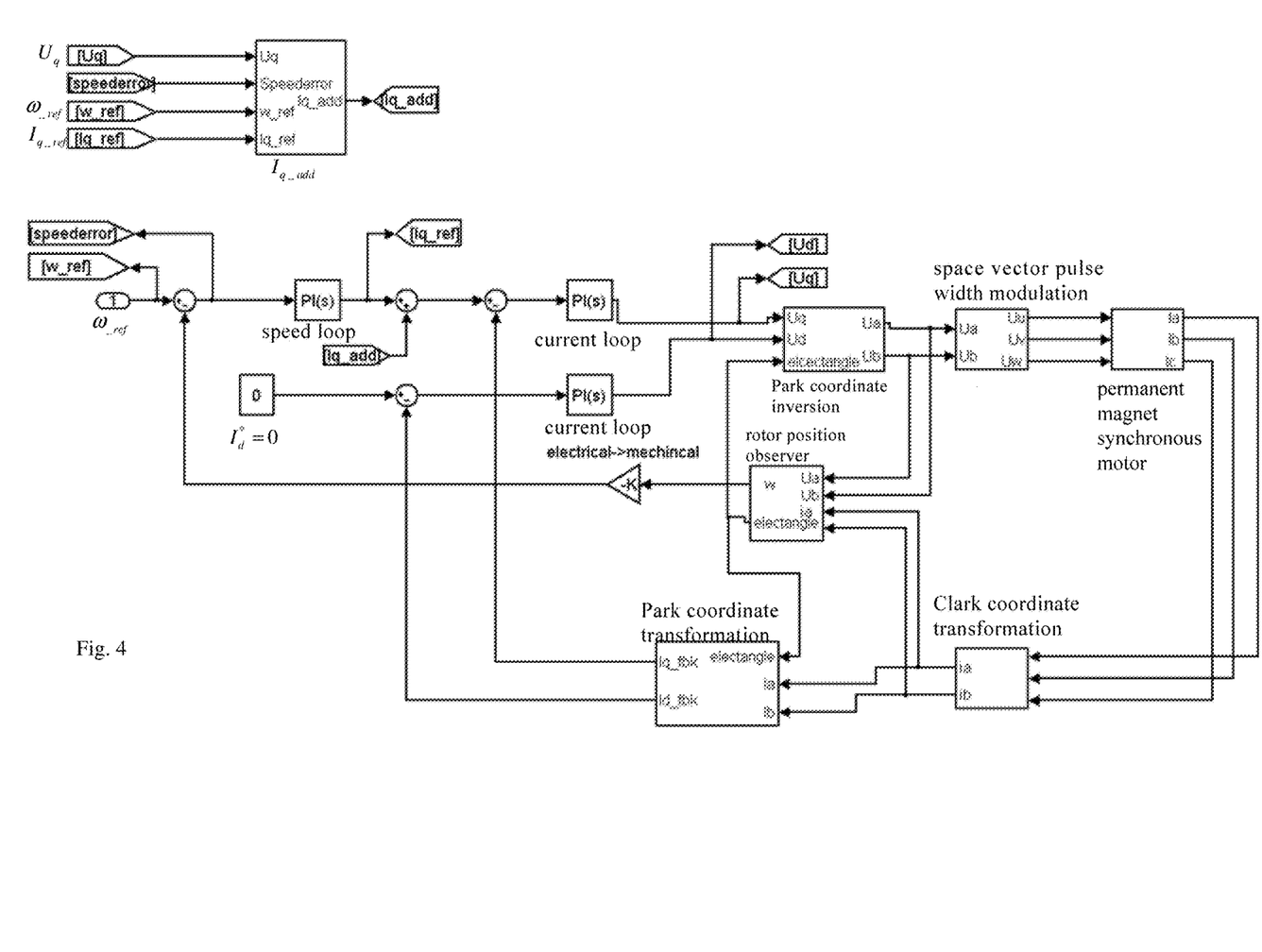
FIG. 4 is a schematic diagram illustrating a control of a q-axis voltage according to an embodiment of the present disclosure.
Figure 5:
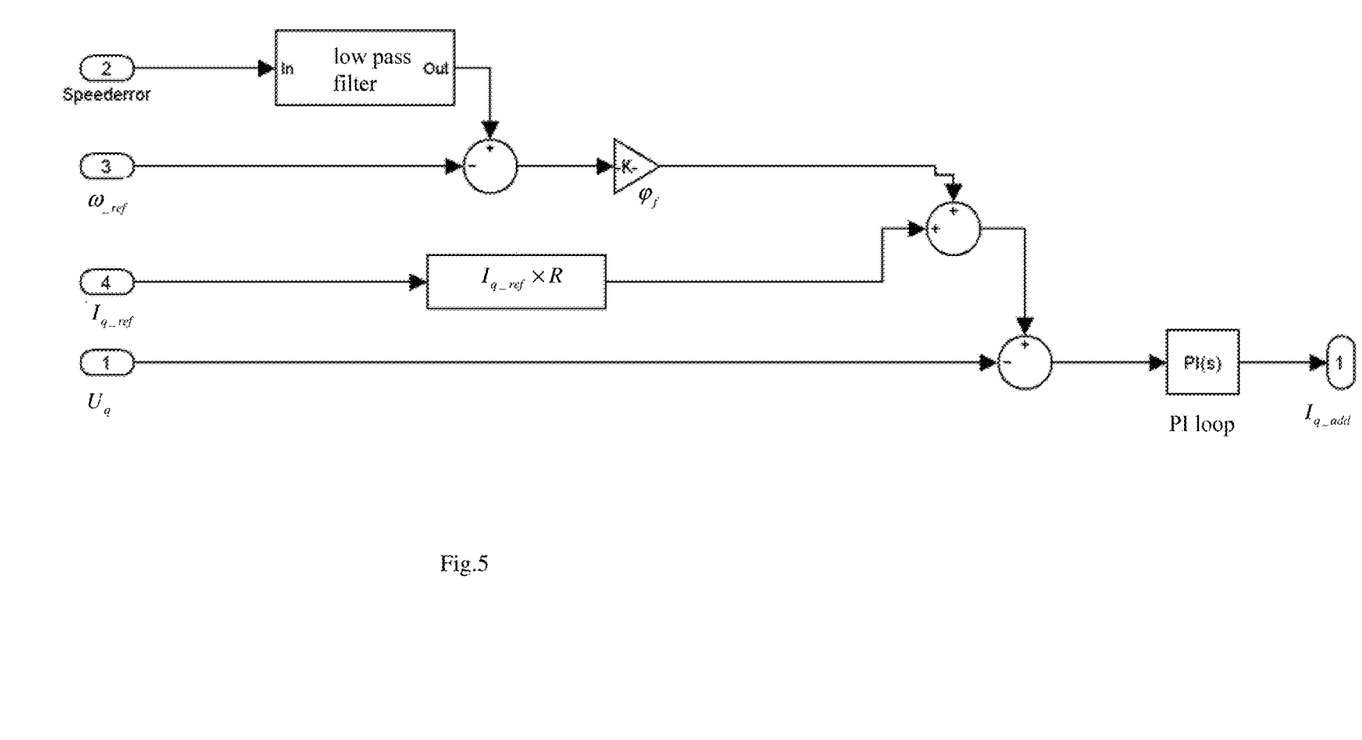
FIG. 5 is a schematic diagram illustrating how to obtain a q-axis compensation current $I_{q\_add}$ according to an embodiment of the present disclosure.

As shown FIG. 4, the q-axis reference current $I_{q\_ref}$ is obtained according to an output of the speed loop, and the q-axis actual voltage $U_q$ is obtained according to an output of the current loop. As shown in FIG. 5, the target speed $\omega_{\_ref}$ is subtracted from the speed error (speederror) processed by a low pass filter to obtain a difference value, and then the difference value is multiplied by the permanent magnet flux linkage $\phi_f$ to obtain a product, and then the product is added to a voltage drop of $I_{q\_ref} \times R$ to obtain a desired q-axis voltage (i.e. the q-axis target voltage $U^*_q$), and finally $U^*_q$ is brought into a PI loop (i.e. $Pi(U^*_q - U_q) = I_{q\_add}$). Thus, the q-axis compensation current $I_{q\_add}$ is obtained.

In step S5, a d-axis target voltage is obtained according to the q-axis reference current, the q-axis compensation current, the target speed, the fluctuation speed and the q-axis inductance, and a PI control is performed on a d-axis actual voltage according to the d-axis target voltage to obtain a d-axis compensation current.

In some embodiments, the d-axis target voltage is obtained according to a formula of $$U^*_d = (I_{q\_ref} + I_{q\_add}) \times (\omega_{\_ref} - \text{lowpass}(\Delta\omega)) \times (-L_q) \quad (6)$$

where $U^*_d$ represents the d-axis target voltage, $I_{q\_ref}$ represents the q-axis reference current, $I_{q\_add}$ represents the q-axis compensation current, $\omega_{\_ref}$ represents the target speed, Δω represents the fluctuation speed and $L_q$ represents the q-axis inductance.

Figure 6:
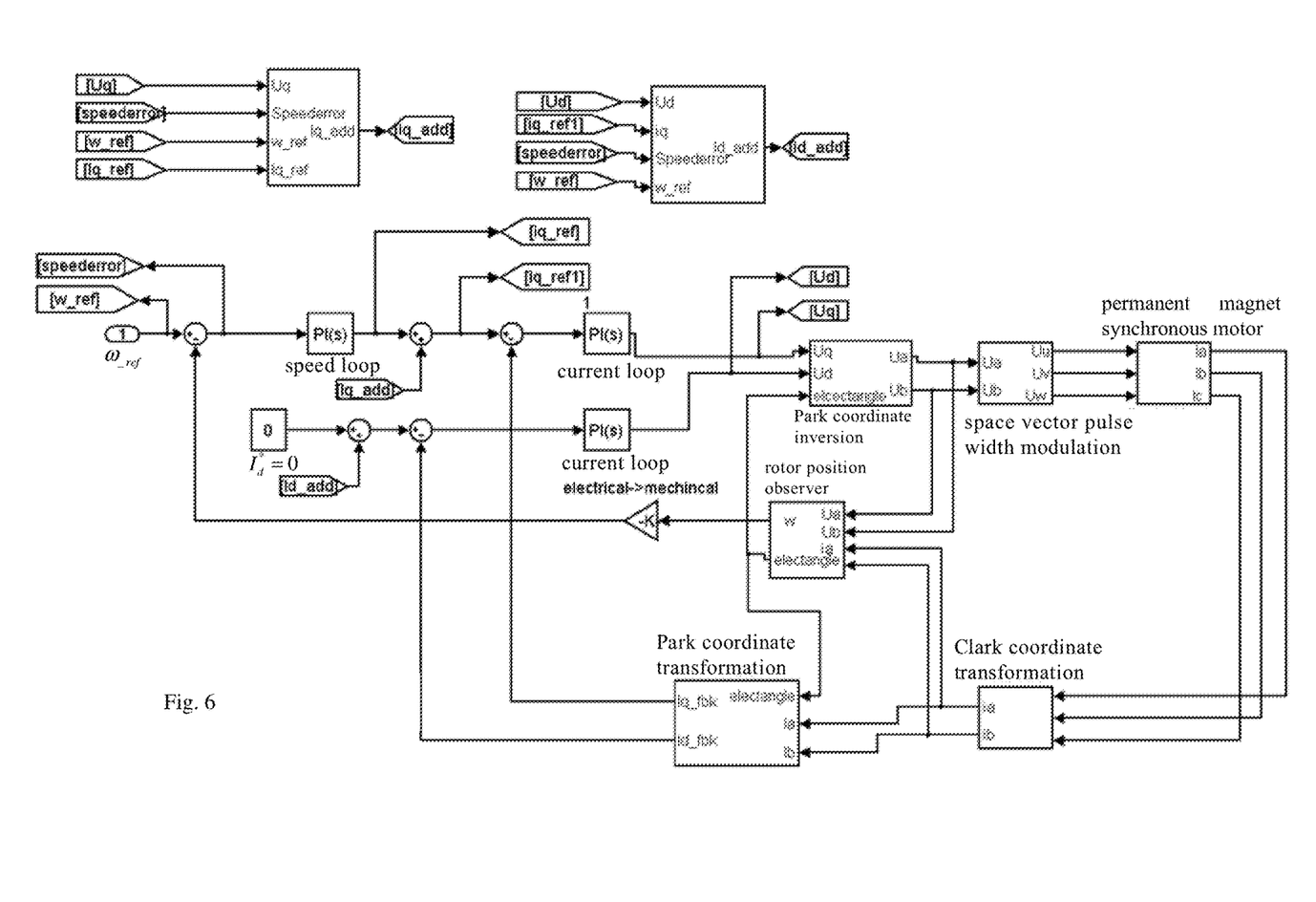
FIG. 6 is a schematic diagram illustrating a method for suppressing a speed fluctuation of a permanent magnet synchronous motor according to an embodiment of the present disclosure.
Figure 7:
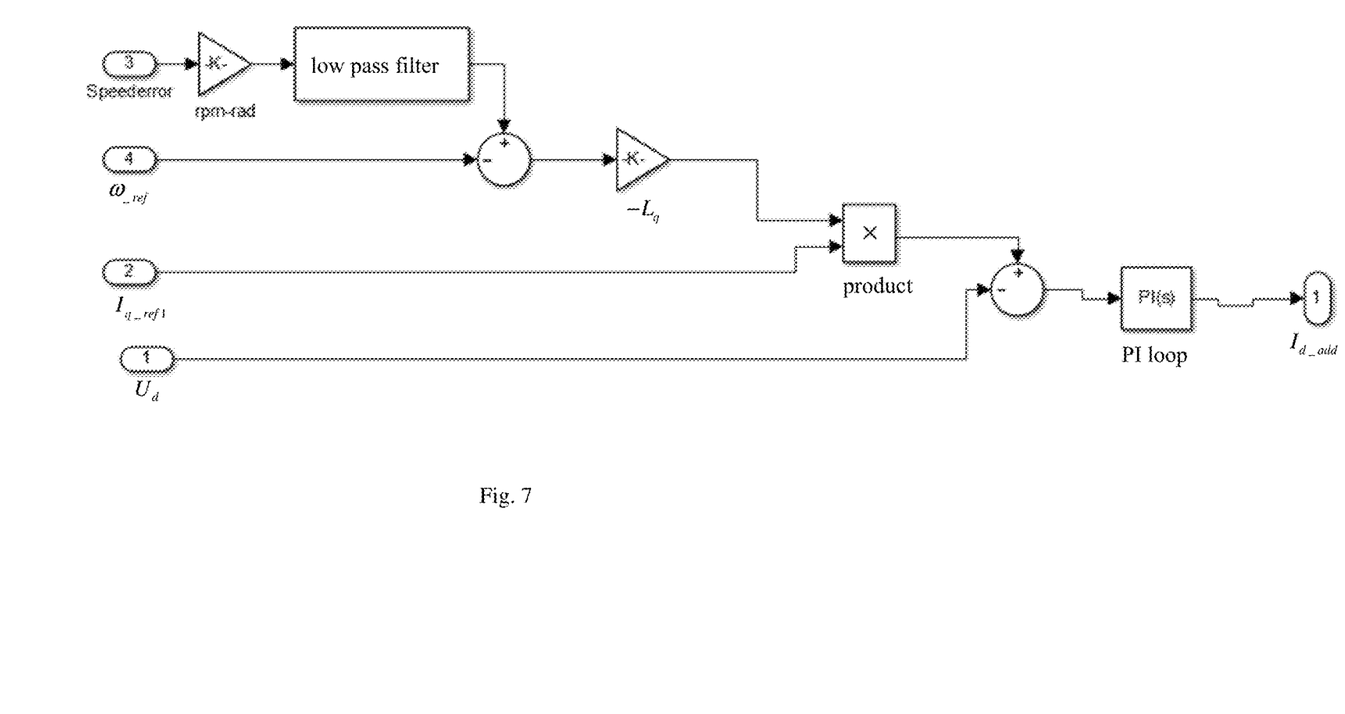
FIG. 7 is a schematic diagram illustrating how to obtain a d-axis compensation current $I_{d\_add}$ according to an embodiment of the present disclosure.

As shown in FIG. 6, a q-axis specified current $I_{q\_ref} + I_{q\_add}$ is obtained according to the output of the speed loop, and the d-axis actual voltage $U_d$ is obtained according to the output of the current loop. As shown in FIG. 7, the target speed $\omega_{\_ref}$ is subtracted from the speed error (speederror) processed by a low pass filter to obtain a difference value, and then the difference value is multiplied by a negative value of the q-axis inductance (i.e. $-L_q$) to obtain a product, and then the product is multiplied by a sum of $I_{q\_ref}$ and $I_{q\_add}$ (i.e. $I_{q\_ref} + I_{q\_add}$) to obtain a desired d-axis voltage (i.e. the d-axis target voltage $U^*_d$), and finally $U^*_d$ is brought into the PI loop (i.e. $Pi(U^*_d - U_d) = I_{d\_add}$), thus obtaining the d-axis compensation current $I_{d\_add}$.

In step S6, the q-axis compensation current and the q-axis reference current are superposed to perform a feedforward compensation on the q-axis current, and the d-axis compensation current and the d-axis reference current are superposed to perform a feedforward compensation on the d-axis current. In other words, the q-axis compensation current $I_{q\_add}$ obtained in step S4 and the d-axis compensation current $I_{d\_add}$ obtained in step S5 are fed forward to corresponding current loops respectively, so as to realize the suppression of the speed fluctuation of the permanent magnet synchronous motor.

Specifically, in some embodiments, the q-axis actual voltage $U_q$ is obtained, and then a voltage feedforward closed loop system may be designed by expanding formula (4), i.e. the voltage feedforward closed loop system is denoted as a formula of $$\omega = \frac{U_q - I_q R}{\varphi_f} \quad (7)$$

where, if the q-axis actual voltage $U_q$ is stable, the electric angular velocity ω is certainly stable, such that the q-axis actual voltage $U_q$ may be controlled by performing a PI loop control on the q-axis current $I_q$, thus achieving a stable speed of the permanent magnet synchronous motor. That is, by obtaining the q-axis actual voltage $U_q$, by performing the PI control ($U^*_q - U_q = 0$) to output the q-axis compensation current $I_{q\_add}$, and by superposing the q-axis compensation current on the q-axis reference current (i.e. the output of the speed loop) to perform a feedforward compensation on the q-axis current $I_q$, an adjustment of the q-axis actual voltage $U_q$ is realized, thus suppressing a voltage error in the q-axis to achieve the suppression of the speed fluctuation.

Similarly, the d-axis actual voltage $U_d$ is obtained, and then a voltage feedforward closed loop system may be similarly designed by expanding formula (4), i.e. the voltage feedforward closed loop system is denoted as a formula of $$\omega = \frac{U_d}{-L_q(I_{q\_ref} + I_{q\_add})} \quad (8)$$

Where, if the d-axis actual voltage $U_d$ is stable, the output of the speed loop $I_{q\_refl} = I_{q\_ref} + I_{q\_add}$ is a relatively stable value, such that the d-axis actual voltage $U_d$ may be controlled by performing a PI loop control on the d-axis current $I_d$, thus realizing a stable speed of the permanent magnet synchronous motor. Relatively speaking, a bandwidth of the PI loop for performing the feedforward compensation on the q-axis voltage is larger than that of the PI loop for performing the feedforward compensation on the d-axis voltage, such that a stable control may be realized, i.e. $U^*_d = (I_{q\_ref} + I_{q\_add}) \times (\omega_{\_ref} - \text{lowpass}(\Delta\omega)) \times (-L_q)$ is set, and then $U^*_d$ is brought into the PI loop, i.e. $Pi(U^*_d - U_d) = I_{d\_add}$, thus obtaining the d-axis compensation current $I_{d\_add}$ and realizing the adjustment of $U_d$, and further realizing the suppression of the speed fluctuation.

In some embodiments, the permanent magnet synchronous motor may be controlled by taking the d-axis target current as zero, if the q-axis target voltage is obtained or the d-axis target voltage is obtained.

Figure 8:
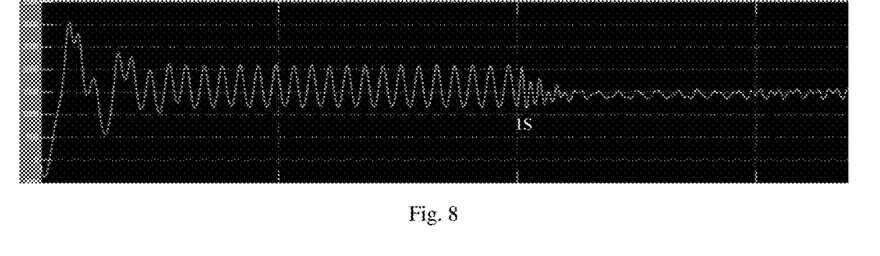
FIG. 8 is a schematic diagram illustrating a speed waveform of a permanent magnet synchronous motor when a speed fluctuation suppression is performed in a case of periodic load according to an exemplary embodiment.

Specifically, according to an example of the present invention, as shown in FIG. 8, when the motor load is the periodic load, before 1s, the speed fluctuation of the motor is not suppressed by the method for suppressing a speed fluctuation of a permanent magnet synchronous motor according to embodiments of the present disclosure, and after 1s, the speed fluctuation of the motor is suppressed by the method for suppressing a speed fluctuation of a permanent magnet synchronous motor according to embodiments of the present disclosure, it may be seen that the speed fluctuation of the permanent magnet synchronous motor is significantly suppressed.

Figure 9:
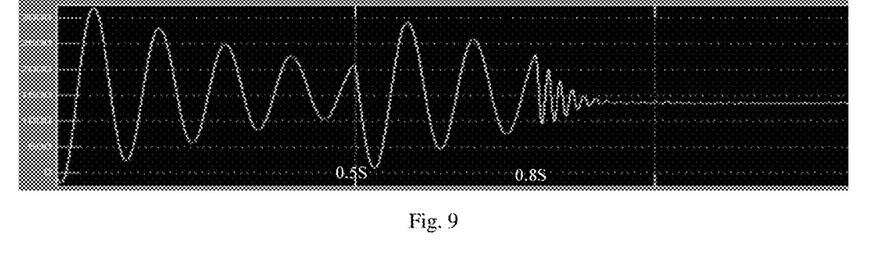
FIG. 9 is a schematic diagram illustrating a speed waveform of a permanent magnet synchronous motor when a speed fluctuation suppression is performed in a case of lower speed loop bandwidth according to an exemplary embodiment.

According to another example of the present invention, as shown in FIG. 9, when the bandwidth of the speed loop is small, the speed fluctuation is big during starting, when a load is suddenly added at 0.5S, the speed fluctuation is larger, and after 0.8s, the speed fluctuation of the motor is suppressed by the method for suppressing a speed fluctuation of a permanent magnet synchronous motor according to embodiments of the present disclosure, it may be seen that the speed fluctuation of the permanent magnet synchronous motor is significantly suppressed.

With the method for suppressing a speed fluctuation of a permanent magnet synchronous motor according to embodiments of the present disclosure, the target speed, the feedback speed, the q-axis inductance and the permanent magnet flux linkage of the permanent magnet synchronous motor are obtained firstly, and the fluctuation speed of the permanent magnet synchronous motor is obtained according to the target speed and the feedback speed, and then the speed loop PI adjusting is performed on the fluctuation speed to obtain the q-axis reference current, and the q-axis target voltage is obtained according to the q-axis reference current, the target speed, the fluctuation speed and the permanent magnet flux linkage, and then the PI control is performed on the q-axis actual voltage according to the q-axis target voltage to obtain the q-axis compensation current, meanwhile the d-axis target voltage is obtained according to the q-axis reference current, the q-axis compensation current, the target speed, the fluctuation speed and the q-axis inductance, and the PI control is performed on the d-axis actual voltage according to the d-axis target voltage to obtain the d-axis compensation current, finally the q-axis compensation current and the q-axis reference current are superposed to perform the feedforward compensation on the q-axis current, and the d-axis compensation current and the d-axis reference current are superposed to perform the feedforward compensation on the d-axis current. Therefore, according to the method for suppressing a speed fluctuation of a permanent magnet synchronous motor of embodiments of the present disclosure, by performing the feedforward compensation on the d-axis current and the q-axis current, the adjustment of the d-axis voltage and the q-axis voltage is realized, thus realizing an effective suppression of the speed fluctuation during operation of the permanent magnet synchronous motor, reducing the occurrence of the vibration, preventing the occurrence of the out-of-step caused if an electromagnetic torque cannot track a load torque in a case of periodic load or abrupt change of load, and ensuring a stable operation of the permanent magnet synchronous motor.

Figure 10:
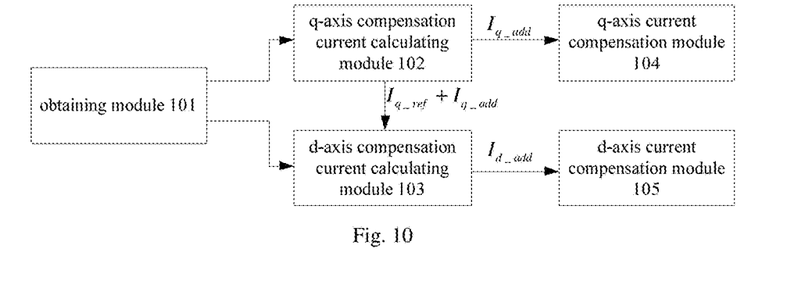
FIG. 10 is a block diagram illustrating a control apparatus of a permanent magnet synchronous motor according to an embodiment of the present disclosure.

FIG. 10 is a block diagram illustrating a control apparatus of a permanent magnet synchronous motor. As shown in FIG. 10, the control apparatus of a permanent magnet synchronous motor includes an obtaining module 101, a q-axis compensation current calculating module 102, a d-axis compensation current calculating module 103, a q-axis current compensation module 104 and a d-axis current compensation module 105.

Specifically, the obtaining module 101 is configured to obtain a target speed and a feedback speed of the permanent magnet synchronous motor, to obtain a fluctuation speed of the permanent magnet synchronous motor according to the target speed and the feedback speed, and to obtain a q-axis inductance and a permanent magnet flux linkage of the permanent magnet synchronous motor; the q-axis compensation current calculating module 102 is configured to perform a speed loop PI adjusting on the fluctuation speed to obtain a q-axis reference current, to obtain a q-axis target voltage according to the q-axis reference current, the target speed, the fluctuation speed and the permanent magnet flux, and to perform a PI control on a q-axis actual voltage according to the q-axis target voltage to obtain a q-axis compensation current; the d-axis compensation current calculating module 103 is configured to obtain a d-axis target voltage according to the q-axis reference current, the q-axis compensation current, the target speed, the fluctuation speed and the q-axis inductance, and to perform a PI control on a d-axis actual voltage according to the d-axis target voltage to obtain a d-axis compensation current; the q-axis current compensation module 104 is configured to superpose the q-axis compensation current and the q-axis reference current to perform a feedforward compensation on a q-axis current;

and the d-axis current compensation module 105 is configured to superpose the d-axis compensation current and the d-axis reference current to perform a feedforward compensation on a d-axis current. In this way, an effective suppression of the speed fluctuation during operation of the permanent magnet synchronous motor may be realized, thus preventing an occurrence of the out-of-step caused if the electromagnetic torque cannot track a load torque in a case of periodic load (compressor) or abrupt change of load.

In some embodiments, the q-axis target voltage is obtained by the q-axis compensation current calculating module 102 according to a formula of $$U^*_q = I_{q\_ref} \times R + (\omega_{\_ref} - \text{lowpass}(\Delta\omega)) \times \phi_f$$

where $U^*_q$ represents the q-axis target voltage, $I_{q\_ref}$ represents the q-axis reference current, R represents a phase resistance, $\omega_{\_ref}$ represents the target speed, $\Delta\omega$ represents the fluctuation speed and $\phi_f$ represents the permanent magnet flux linkage.

Moreover, the specific implementation is shown in FIG. 5.

In some embodiments, the d-axis target voltage is obtained by the d-axis compensation current calculating module 103 according to a formula of $$U^*_d = (I_{q\_ref} + I_{q\_add}) \times (\omega_{\_ref} - \text{lowpass}(\Delta\omega)) \times (-L_q)$$

where $U^*_d$ represents the d-axis target voltage, $I_{q\_ref}$ represents the q-axis reference current, $I_{q\_add}$ represents the q-axis compensation current, $\omega_{\_ref}$ represents the target speed, $\Delta\omega$ represents the fluctuation speed and $L_q$ represents the q-axis inductance.

Moreover, the specific implementation is shown in FIG. 7.

In some embodiments, the control apparatus controls the permanent magnet synchronous motor by taking the d-axis target current as zero, if the q-axis target voltage is obtained by the q-axis compensation current calculating module 102 or the d-axis target voltage is obtained by the d-axis compensation current calculating module 103, specifically as shown in FIG. 6, $I^*_d = 0$.

With the control apparatus of a permanent magnet synchronous motor according to embodiments of the present disclosure, the target speed, the feedback speed, the q-axis inductance and the permanent magnet flux linkage of the permanent magnet synchronous motor are obtained by the obtaining module, and the fluctuation speed of the permanent magnet synchronous motor is obtained according to the target speed and the feedback speed by the obtaining module, and then the q-axis compensation current is obtained by the q-axis compensation current calculating module and the d-axis compensation current is obtained by the d-axis compensation current calculating module, finally the q-axis compensation current and the q-axis reference current are superposed by the q-axis current compensation module to perform the feedforward compensation on the q-axis current, and the d-axis compensation current and the d-axis reference current are superposed by the d-axis current compensation module to perform the feedforward compensation on the d-axis current. Therefore, according to the control apparatus of a permanent magnet synchronous motor of embodiments of the present disclosure, by performing the feedforward compensation on the d-axis current and the q-axis current, the adjustment of the q-axis voltage and the d-axis voltage is realized, thus realizing an effective suppression of the speed fluctuation during operation of the permanent magnet synchronous motor, reducing the occurrence of the vibration, preventing the occurrence of the out-of-step caused if an electromagnetic torque cannot track a load torque in a case of periodic load or abrupt change of load, and ensuring a stable operation of the permanent magnet synchronous motor.

In addition, embodiments of the present disclosure also provide a compressor control system, including the above-described control apparatus of a permanent magnet synchronous motor.

With the compressor control system according to embodiments of the present disclosure, by performing the feedforward compensation on the d-axis current and the q-axis current with the control apparatus of the permanent magnet synchronous motor, an adjustment of the d-axis voltage and the q-axis voltage may be realized, thus realizing an effective suppression of the speed fluctuation during operation of the permanent magnet synchronous motor, reducing the occurrence of the vibration, preventing the occurrence of the out-of-step caused if an electromagnetic torque cannot track a load torque in a case of periodic load or abrupt change of load, and ensuring a stable operation of the permanent magnet synchronous motor. Therefore, according to the compressor control system of embodiments of the present disclosure, the speed fluctuation of the permanent magnet synchronous motor may be suppressed, thus reducing the occurrence of the vibration, preventing a pipe crack risk caused in a case that an air conditioner is running for a long time with the large vibration, ensuring a quality of the air conditioner and improving a comfort of a user.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for suppressing a speed fluctuation of a permanent magnet synchronous motor, comprising:
    obtaining a target speed and a feedback speed of the permanent magnet synchronous motor, and obtaining a fluctuation speed of the permanent magnet synchronous motor according to the target speed and the feedback speed;
    obtaining a q-axis inductance and a permanent magnet flux linkage of the permanent magnet synchronous motor;
    performing a speed loop PI adjusting on the fluctuation speed to obtain a q-axis reference current, and obtaining a q-axis target voltage according to the q-axis reference current, the target speed, the fluctuation speed and the permanent magnet flux linkage;
    performing a PI control on a q-axis actual voltage according to the q-axis target voltage to obtain a q-axis compensation current;
    obtaining a d-axis target voltage according to the q-axis reference current, the q-axis compensation current, the target speed, the fluctuation speed and the q-axis inductance, and performing a PI control on a d-axis actual voltage according to the d-axis target voltage to obtain a d-axis compensation current;
    superposing the q-axis compensation current and the q-axis reference current to perform a feedforward compensation on a q-axis current, and superposing the d-axis compensation current and the d-axis reference current to perform a feedforward compensation on a d-axis current.

2. The method according to claim 1, wherein the q-axis target voltage is obtained according to a formula of $$U^*_q = I_{q\_ref} \times R + (\omega_{\_ref} - \text{lowpass}(\Delta\omega)) \times \phi_f$$

where $U^*_q$ represents the q-axis target voltage, $I_{q\_ref}$ represents the q-axis reference current, R represents a phase resistance, $\omega_{\_ref}$ represents the target speed, $\Delta\omega$ represents the fluctuation speed and $\phi_f$ represents the permanent magnet flux linkage.

3. The method according to claim 1, wherein the d-axis target voltage is obtained according to a formula of $$U^*_d = (I_{q\_ref} + I_{q\_add}) \times (\omega_{\_ref} - \text{lowpass}(\Delta\omega)) \times (-L_q)$$

where $U^*_d$ represents the d-axis target voltage, $I_{q\_ref}$ represents the q-axis reference current, $I_{q\_add}$ represents the q-axis compensation current, $\omega_{\_ref}$ represents the target speed, $\Delta\omega$ represents the fluctuation speed and $L_q$ represents the q-axis inductance.

4. The method according to claim 1, wherein the permanent magnet synchronous motor is controlled by taking the d-axis target current as zero, if the q-axis target voltage is obtained or the d-axis target voltage is obtained.

5. A control apparatus of a permanent magnet synchronous motor, comprising:
    an obtaining module, configured to obtain a target speed and a feedback speed of the permanent magnet synchronous motor, to obtain a fluctuation speed of the permanent magnet synchronous motor according to the target speed and the feedback speed, and to obtain a q-axis inductance and a permanent magnet flux linkage of the permanent magnet synchronous motor;
    a q-axis compensation current calculating module, configured to perform a speed loop PI adjusting on the fluctuation speed to obtain a q-axis reference current, to obtain a q-axis target voltage according to the q-axis reference current, the target speed, the fluctuation speed and the permanent magnet flux, and to perform a PI control on a q-axis actual voltage according to the q-axis target voltage to obtain a q-axis compensation current;
    a d-axis compensation current calculating module, configured to obtain a d-axis target voltage according to the q-axis reference current, the q-axis compensation current, the target speed, the fluctuation speed and the q-axis inductance, and to perform a PI control on a d-axis actual voltage according to the d-axis target voltage to obtain a d-axis compensation current;

a q-axis current compensation module, configured to superpose the q-axis compensation current and the q-axis reference current to perform a feedforward compensation on a q-axis current;

a d-axis current compensation module, configured to superpose the d-axis compensation current and the d-axis reference current to perform a feedforward compensation on a d-axis current.

6. The control apparatus according to claim 5, wherein the q-axis target voltage is obtained by the q-axis compensation current calculating module according to a formula of $$U^*_q = I_{q\_ref} \times R + (\omega_{\_ref} - \text{lowpass}(\Delta\omega)) \times \phi_f$$

where $U^*_q$ represents the q-axis target voltage, $I_{q\_ref}$ represents the q-axis reference current, R represents a phase resistance, $\omega_{\_ref}$ represents the target speed, $\Delta\omega$ represents the fluctuation speed and $\phi_f$ represents the permanent magnet flux linkage.

7. The control apparatus according to claim 5, wherein the d-axis target voltage is obtained by the d-axis compensation current calculating module according to a formula of $$U^*_d = (I_{q\_ref} + I_{q\_add}) \times (\omega_{\_ref} - \text{lowpass}(\Delta\omega)) \times (-L_q)$$

where $U^*_d$ represents the d-axis target voltage, $I_{q\_ref}$ represents the q-axis reference current, $I_{q\_add}$ represents the q-axis compensation current, $\omega_{\_ref}$ represents the target speed, $\Delta\omega$ represents the fluctuation speed and $L_q$ represents the q-axis inductance.

8. The control apparatus according to claim 5, wherein the control apparatus controls the permanent magnet synchronous motor by taking the d-axis target current as zero, if the q-axis target voltage is obtained by the q-axis compensation current calculating module or the d-axis target voltage is obtained by the d-axis compensation current calculating module.

9. A compressor control system, comprising a control apparatus of a permanent magnet synchronous motor, wherein the control apparatus comprises:

an obtaining module, configured to obtain a target speed and a feedback speed of the permanent magnet synchronous motor, to obtain a fluctuation speed of the permanent magnet synchronous motor according to the target speed and the feedback speed, and to obtain a q-axis inductance and a permanent magnet flux linkage of the permanent magnet synchronous motor;

a q-axis compensation current calculating module, configured to perform a speed loop PI adjusting on the fluctuation speed to obtain a q-axis reference current, to obtain a q-axis target voltage according to the q-axis reference current, the target speed, the fluctuation speed and the permanent magnet flux, and to perform a PI control on a q-axis actual voltage according to the q-axis target voltage to obtain a q-axis compensation current;

a d-axis compensation current calculating module, configured to obtain a d-axis target voltage according to the q-axis reference current, the q-axis compensation current, the target speed, the fluctuation speed and the q-axis inductance, and to perform a PI control on a d-axis actual voltage according to the d-axis target voltage to obtain a d-axis compensation current;

a q-axis current compensation module, configured to superpose the q-axis compensation current and the q-axis reference current to perform a feedforward compensation on a q-axis current;

a d-axis current compensation module, configured to superpose the d-axis compensation current and the d-axis reference current to perform a feedforward compensation on a d-axis current.

10. The compressor control system according to claim 9, wherein the q-axis target voltage is obtained by the q-axis compensation current calculating module according to a formula of $$U^*_q = I_{q\_ref} \times R + (\omega_{\_ref} - \text{lowpass}(\Delta\omega)) \times \phi_f$$

where $U^*_q$ represents the q-axis target voltage, $I_{q\_ref}$ represents the q-axis reference current, R represents a phase resistance, $\omega_{\_ref}$ represents the target speed, $\Delta\omega$ represents the fluctuation speed and $\phi_f$ represents the permanent magnet flux linkage.

11. The compressor control system according to claim 9, wherein the d-axis target voltage is obtained by the d-axis compensation current calculating module according to a formula of $$U^*_d = (I_{q\_ref} + I_{q\_add}) \times (\omega_{\_ref} - \text{lowpass}(\Delta\omega)) \times (-L_q)$$

where $U^*_d$ represents the d-axis target voltage, $I_{q\_ref}$ represents the q-axis reference current, $I_{q\_add}$ represents the q-axis compensation current, $\omega_{\_ref}$ represents the target speed, $\Delta\omega$ represents the fluctuation speed and $L_q$ represents the q-axis inductance.

12. The compressor control system according to claim 9, wherein the control apparatus controls the permanent magnet synchronous motor by taking the d-axis target current as zero, if the q-axis target voltage is obtained by the q-axis compensation current calculating module or the d-axis target voltage is obtained by the d-axis compensation current calculating module.

* * * * *